Sept. 20, 1949.  G. S. TARRY  2,482,722
MECHANISM FOR PRODUCING INTERMITTENT ROTARY MOTION
Filed Feb. 27, 1948  3 Sheets-Sheet 1
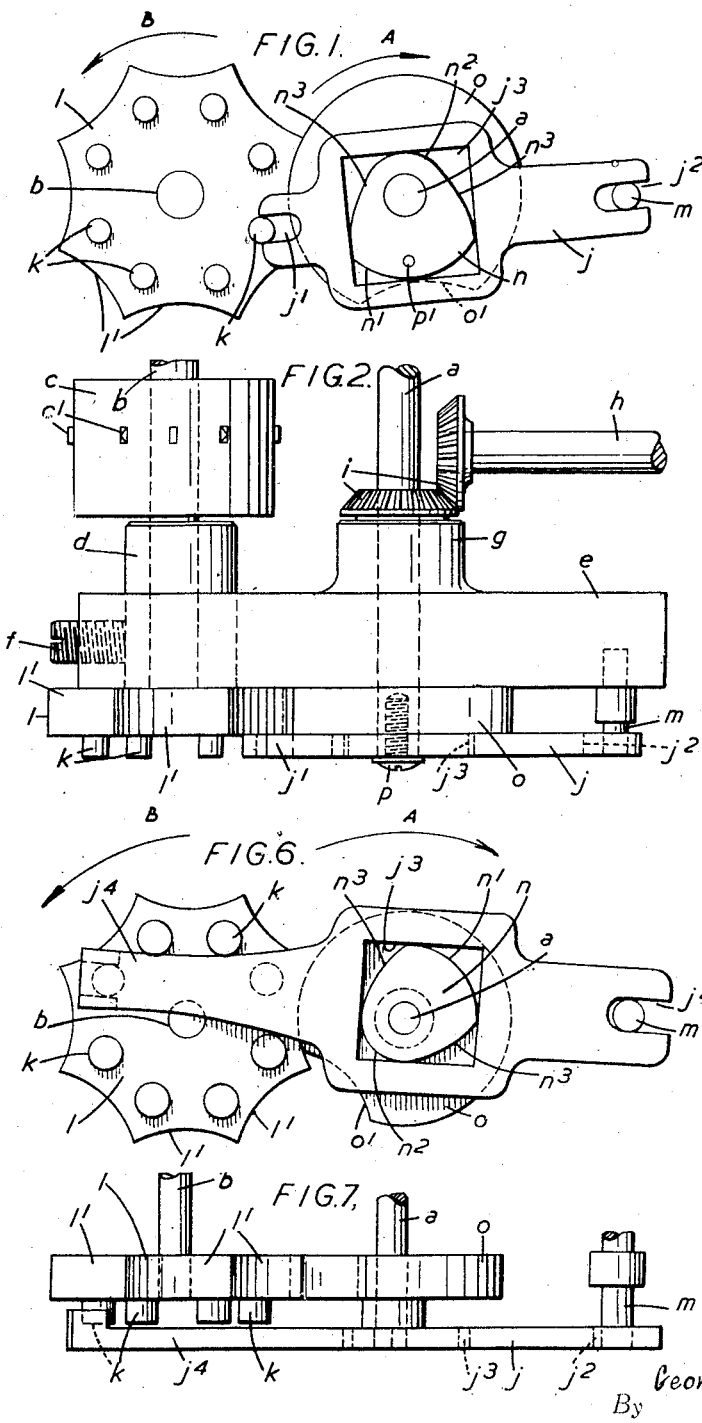
Inventor
George S. Tarry

Patented Sept. 20, 1949

2,482,722

UNITED STATES PATENT OFFICE 2,482,722

MECHANISM FOR PRODUCING INTERMITTENT ROTARY MOTION

George Stanley Tarry, Leicester, England

Application February 27, 1948, Serial No. 11,553
In Great Britain July 13, 1945

Section 1, Public Law 690, August 8, 1946
Patent expires July 13, 1965

6 Claims. (Cl. 74—436)

This invention relates to mechanism for producing intermittent rotary motion, and concerns particularly such mechanism of the kind comprising a continuously driveable spindle and associated drive-transmitting means whereby the continuous rotary motion is converted into intermittent rotary motion imparted to another spindle.

It is principally the intention to embody the invention in a drive for an intermittently operable film sprocket suitable for application to sub-standard cinematograph projectors, in lieu of the claw or claws at present widely used for racking the film. The invention, however, is by no means limited in this respect as it may also be applied to standard projectors in place of the conventional Geneva stop motion, and, in fact, to any machine or apparatus including an intermittently rotable part or parts and in connection with which its use would be advantageous.

The object of the invention is to provide a generally improved mechanism of the kind referred to which will be simple and inexpensive to produce and particularly efficient and silent in operation.

So far as its application to sub-standard film projectors is concerned, the principal aim is to enable a positively, silently and intermittently operated sprocket to be employed with the narrower gauges of film, such as 8 mm. and 9.5 mm. as a sprocket of this form is considered to be less detrimental to such film than a claw or claws.

Figure 3:
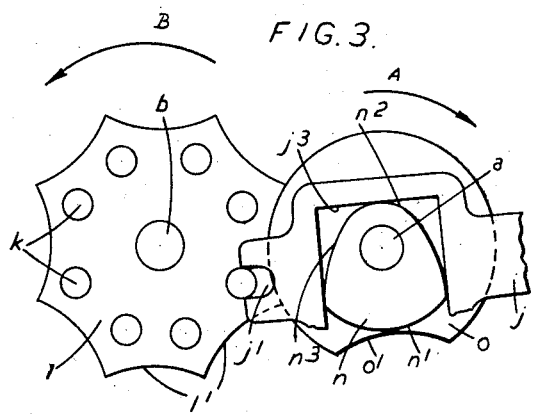
Figure 4:
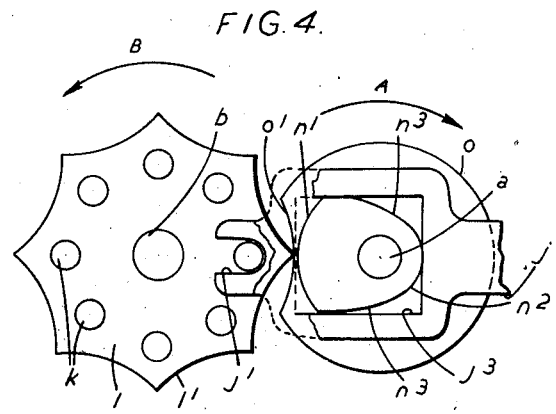
Figure 5:
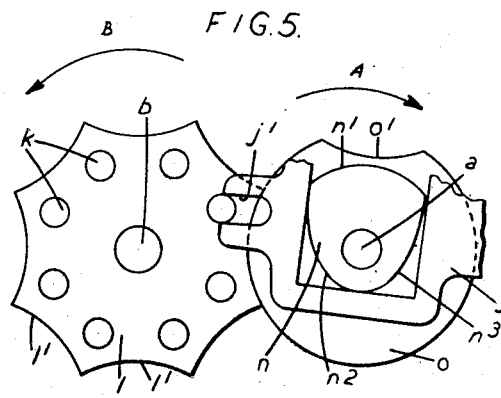
Figure 8:
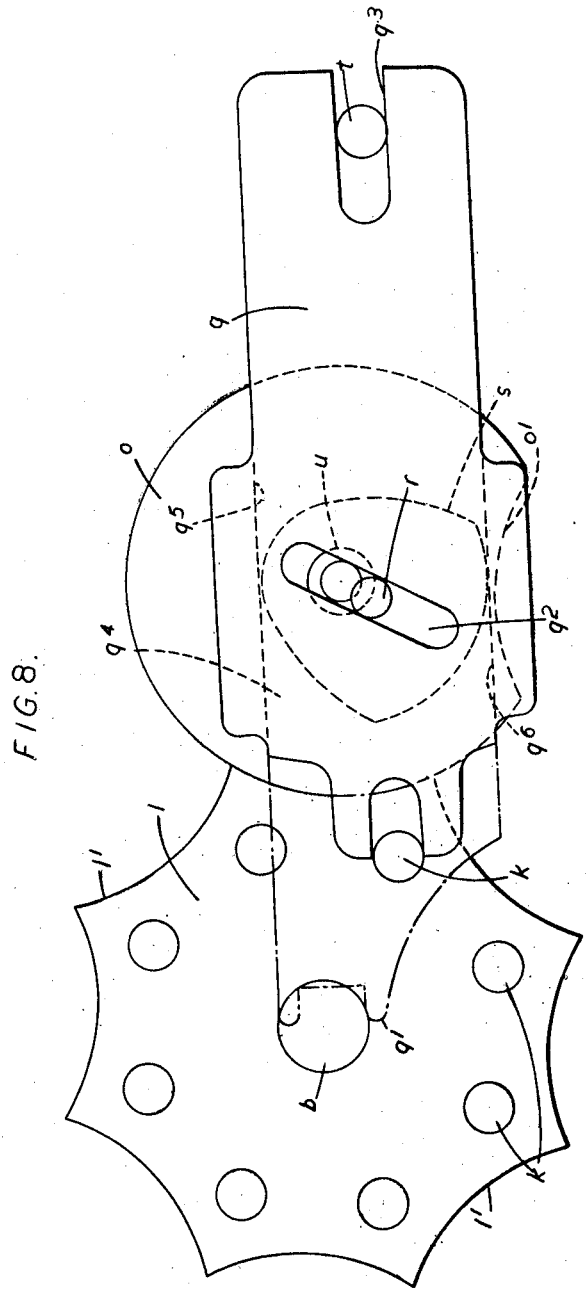

Specific examples of the improved mechanism for producing intermittent rotary motion will now be described with reference to the accompanying drawings, wherein, Figure 1 is a side view of a simple form of the said mechanism, Figure 2 is a plan view of the same as applied, merely by way of example, to the intermittent drive of a film sprocket suitable for use in a sub-standard cinematograph projector, Figures 3, 4 and 5 are three detail side views depicting successive stages in the operation of the mechanism, Figures 6 and 7 are side and plan views respectively of a modified form of the mechanism designed for quicker film shift, as will be hereinafter described, and Figure 8 is a side view of a still further form of the improved mechanism, converted from an existing sub-standard film claw action.

Referring to Figures 1 and 2, the continuously driven spindle is indicated at $a$ and the intermittently rotatable spindle at $b$. In Figure 2 the spindle $b$ has rigidly secured thereto an intermittently operated film sprocket $c$ furnished with a single circular series of projections or teeth $c^1$ adapted for engagement with notches formed centrally in sub-standard film. The spindle $b$, moreover, is mounted eccentrically in a bearing bush $d$ which can be adjusted angularly within a bracket or support $e$ for a purpose hereinafter to be described. A grub screw $f$ is provided to set the bush $d$ after adjustment. The spindle $a$, which may be driven from any conventional source, such as a small electric motor, is mounted to rotate in a bearing $g$ formed on the bracket or support $e$. If desired, and as shown in Figure 2, the cooling fan spindle $h$ of the projector may be driven from the spindle $a$ through the medium of bevel gearing $i$.

In accordance with the present invention there is provided a lever $j$ which is forked or bifurcated at one end as indicated at $j^1$ for engagement with fixed pins $k$ on an intermittent pin wheel $l$ rigidly secured upon one end of the spindle $b$. At its opposite end the lever $j$ is formed with a longitudinal open-ended slot $j^2$ to enable it to engage a fixed pivot pin $m$ which is remote from the axis of the spindle $b$ and extends laterally from the bracket or support $e$. Between its opposite ends the lever $j$ is enlarged and has formed therein a square-shaped opening $j^3$ to accommodate a rotary cam $n$ secured to the outer end of the driven spindle $a$. This cam is of the three-sided shape shown, that is to say it comprises diametrically opposite concentric portions $n^1$ and $n^2$ of respectively different radii, joined by outwardly curved side portions $n^3$. The four sides of the opening $j^3$ are permanently in engagement with the cam. The spindle $a$ is driven clockwise as indicated by the arrow A in the drawings. The construction so far described is therefore such that as the cam $n$ revolves the lever $j$ will have imparted to it combined reciprocatory and oscillatory motions. Thus, as will be seen from a consideration of Figures 3, 4 and 5, the lever $j$ is advanced longitudinally to engage one of the pins $k$ and simultaneously swung upwardly to turn the wheel $l$ one step in a counter-clockwise direction (arrow B). After it has assumed the horizontal position shown in Figure 4, the lever commences to withdraw longitudinally from the aforesaid pin and, after complete disengagement from the latter swings downwardly and so returns to its original position preparatory to engagement with the next pin, and so on. In Figure 3, the lever $j$ is partially advanced, fully advanced in Figure 4 and partially withdrawn in Figure 5, The longitudinal, i. e. reciprocatory, movements of the lever $j$ are permitted by the slot $j^2$. Except when being actually turned the pin wheel $l$ is securely locked against angular movement by means of a circular locking wheel $o$ which is concentrically arranged with respect to the axis of the spindle $a$ and rigidly secured to the end of the latter, together with the cam $n$, by means of a screw $p$ (see Figure 2). The periphery of the wheel $o$ is smooth and adapted for engagement in concave recesses $l^1$ formed in the periphery of the pin wheel $l$. There are as many recesses $l^1$ as there are pins $k$, viz. eight in the particular example now being described. The locking wheel $o$ is, however, peripherally gapped by making therein a concave recess $o^1$ which as it passes by the pin wheel $l$ has the effect of releasing the latter and enabling it to be turned. In the particular example illustrated the parts are so arranged that the recess $o^1$ passes by the opposed portion of the pin wheel $l$ during each upward, i. e. operative, stroke of the lever $j$ (Figure 4). To achieve the motion required the cam $n$ is set with the longer, $n^1$, of its two concentric portions disposed adjacent to the recess $o^1$. If desired, the cam $n$ and the locking wheel $o$ may be securely held together in the correct relation by means of a pin $p^1$ passed through them as indicated in Figure 1. Any other suitable means of securing these two parts together may, however, be adopted. In each of Figures 3, 4 and 5 a portion of the lever $j$ is broken away to disclose the action of the locking wheel more clearly. The bearing bush $d$ is adjustable to vary the relative positions of the centres of the pin and locking wheels, thereby enabling the recessed portions $l^1$ of the pin wheel to fit closely up to the outwardly curved surface of the locking wheel $o$.

In the modification illustrated in Figures 6 and 7, the operation of the mechanism is speeded up by extending the forward end of the lever $j$ so as to adapt it for action on pins at the opposite side of the pin wheel $l$. Thus in this example the lever is formed with an extension $j^4$ which is thickened at its free end and recessed for engagement with the pins $k$. The increase in speed is attained by the greater distance moved by the operative end of the lever $j$ at each turn of the shaft $a$ and also as a consequence of the necessary reversal in the manner of operation of the lever. That is to say, the lever must be swung downwardly instead of upwardly to impart to the pin wheel an operative movement in a counter-clockwise direction. To enable this to be done, the cam $n$ is secured to the locking wheel $o$ with the smaller, $n^2$ of the concentric portions of said cam disposed adjacent to the concave recess $o^1$. Otherwise the general construction and operation of the modified mechanism is the same. When adopted for use in driving an intermittently operated film sprocket this mechanism produces a quicker film shift than the mechanism described with reference to Figures 1–5.

Figure 8 illustrates a known form of substandard film claw action device converted to a mechanism constructed in accordance with the present invention. The existing parts of the claw action comprise a reciprocating and oscillating lever $q$ formed at its operative end with a double claw $q^1$ adapted for direct engagement with notches in the film, an eccentric spindle $r$ working in a slot $q^2$ formed in the said lever for reciprocating the latter back and forth in relation to the film, and a three-cornered cam $s$ for oscillating the lever and thereby imparting thereto the requisite operative and idle strokes. At its end remote from the double claw the lever $q$ is formed with a longitudinal open-ended slot $q^3$ in which is engaged a fixed pivot pin $t$. The central portion of the lever is widened and so flanged at the edges as to provide a space $q^4$ for accommodation of the cam $s$ which latter is secured upon a continuously driveable spindle $u$ and arranged for action between the flanges or guides $q^5$ and $q^6$. To convert this known mechanism, a locking wheel $o$ is added to the spindle $u$, and the forward portion of the lever $q$ (indicated in dot-and-dash lines) is removed and re-shaped as shown in full lines to adapt it for engagement with pins $k$ on an intermittent pin wheel $l$ provided on a spindle $b$ which is added to the mechanism. The intermittently operated film sprocket is secured to the last mentioned spindle.

The improved mechanism provided by the invention is well adapted for application to substandard film projectors wherein the use of the Geneva stop motion of standard projectors would be impracticable for the reason that the intermittently operated film sprocket would only be able to have four teeth in contradistinction to the sixteen normally provided on a standard sprocket.

What I claim is:

1. Mechanism for producing intermittent rotary motion comprising, in combination, a support, a bearing in said support, a spindle mounted for rotation intermittently in said bearing, a wheel which is secured on said spindle, pins fixed in the wheel, a slotted lever formed for cooperation with said pins, a fixed pivot element located on the support remote from the axis of the pin wheel, said pivot element being engaged with a slot in the said lever, a continuously driveable spindle mounted for rotation in the support, rotary means which are mounted with the last mentioned spindle and adapted for action upon surfaces on the slotted lever to impart to the latter movement longitudinally first in one direction and then in the opposite direction respectively to engage and withdraw from engagement with a pin, and, conjointly with such longitudinal movements, movement angularly in one direction to displace the said pin and in the reverse direction to its original position preparatory to engagement with the next pin and so on, and a locking wheel which is mounted to rotate together with the aforesaid rotary means and is adapted for cooperation with the pin wheel suchwise as to lock the latter during its idle periods and release it for turning at required times.

2. Mechanism for producing intermittent rotary motion comprising, in combination, a support, a bearing in said support, a spindle mounted for rotation intermittently in said bearing, a wheel which is mounted on said spindle, pins fixed in the wheel, a lever which is formed for cooperation with said pins and has therein a slot and a rectangular opening, a fixed pivot element located on the support remote from the axis of the pin wheel, said pivot element being engaged with the slot in the said lever, a continuously driveable spindle mounted for rotation in the support, a rotary cam which is mounted upon the last mentioned spindle and accommodated within the rectangular opening in the lever so that by action upon all four sides of the opening the said lever is caused to move longitudinally first in one direction and then in the opposite direction respectively to engage and withdraw from engagement with a pin, and, conjointly with such longitudinal movements, moves angularly in one direction to displace the said pin and in the reverse direction to its original position preparatory to engagement with the next pin, and so on, and a locking wheel which is mounted to rotate together with the aforesaid rotary cam means and is adapted for co-operation with the pin wheel suchwise as to lock the latter during its idle periods and release it for turning at required times.

3. Mechanism for producing intermittent rotary motion comprising, in combination, a support, a bearing in said support, a spindle mounted for rotation intermittently in said bearing, a wheel which is secured on said spindle, pins fixed in the wheel, a slotted lever formed for co-operation with said pins, a fixed pivot element located on the support remote from the axis of the pin wheel, said pivot element being engaged with a slot in the said lever, an eccentric pin arranged to work in another slot in the lever and by which the said lever is reciprocated back and forth, a continuously driveable spindle mounted for rotation in the support, a rotary cam which is mounted upon the last mentioned spindle and arranged for action upon surfaces on the lever suchwise as to impart thereto oscillatory motion about the pivot element, the said lever being thereby caused to co-operate with the pins for the purpose of effecting intermittent rotation of the pin wheel, and a locking wheel which is mounted to rotate together with the aforesaid rotary cam and is adapted for co-operation with the pin wheel suchwise as to lock the latter during its idle periods and release it for turning at required times.

4. Mechanism for producing intermittent rotary motion comprising, in combination, a support, a bearing in said support, a spindle mounted for rotation intermittently in said bearing, a wheel which is mounted on said spindle, pins fixed in the wheel, a lever which is formed for co-operation with said pins and has therein a slot and a square shaped opening, a fixed pivot element located on the support remote from the axis of the pin wheel, said pivot element being engaged with the slot in the said lever, a continuously driveable spindle mounted for rotation in the support, a rotary cam which is mounted upon the last mentioned spindle and accommodated within the square-shaped opening in the lever, said cam being of three cornered shape comprising diametrically opposite concentric portions of respectively different radii joined by outwardly curved side portions so that by action of the cam upon all four sides of the opening in said lever the latter is caused to move longitudinally first in one direction and then in the opposite direction respectively to engage and withdraw from engagement with a pin, and, conjointly with such longitudinal movements, moves angularly in one direction to displace the said pin and in the reverse direction to its original position preparatory to engagement with the next pin, and so on, and a locking wheel which is mounted to rotate together with the rotary cam and is adapted for co-operation with the pin wheel suchwise as to lock the latter during its idle periods and release it for turning at required times.

5. Mechanism according to claim 1, wherein the operative end of the lever is adapted for engagement with pins on the near side of the pin wheel, i. e. the side nearest to the rotary means.

6. Mechanism according to claim 1, wherein the said lever is of sufficient length for its operative end to engage pins on the far side of the pin wheel, i. e. the side remote from the rotary means.

GEORGE STANLEY TARRY.

REFERENCES CITED

The following references are of record in the file of this patent:

UNITED STATES PATENTS

| Number | Name | Date |
|---|---|---|
| 747,990 | Liberman | Dec. 29, 1903 |
| 1,383,006 | Minne | June 28, 1921 |
| 1,676,117 | Stenger | July 3, 1928 |